US009836507B2

(12) United States Patent
Hu et al.

(10) Patent No.: US 9,836,507 B2
(45) Date of Patent: *Dec. 5, 2017

(54) METHOD AND SYSTEM FOR ADAPTIVELY BUILDING A COLUMN STORE DATABASE FROM A TEMPORAL ROW STORE DATABASE BASED ON QUERY DEMANDS

(71) Applicant: Futurewei Technologies, Inc., Plano, TX (US)

(72) Inventors: Ron Chung Hu, Palo Alto, CA (US); Guangyu Shi, Cupertino, CA (US); Masood Mortazavi, San Jose, CA (US); Chi Yong Ku, San Ramon, CA (US); Mengmeng Chen, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 403 days.

This patent is subject to a terminal disclaimer.

(21) Appl. No.: 14/488,775

(22) Filed: Sep. 17, 2014

(65) Prior Publication Data

US 2016/0078089 A1    Mar. 17, 2016

(51) Int. Cl.
*G06F 17/30* (2006.01)

(52) U.S. Cl.
CPC .. *G06F 17/30466* (2013.01); *G06F 17/30289* (2013.01); *G06F 17/30315* (2013.01); *G06F 17/30377* (2013.01); *G06F 17/30592* (2013.01)

(58) Field of Classification Search
CPC ......... G06F 17/30498; G06F 17/30289; G06F 17/30466; G06F 17/30592

USPC .......................................................... 707/714
See application file for complete search history.

(56) References Cited

U.S. PATENT DOCUMENTS

| | | | |
|---|---|---|---|
| 8,762,407 B2 * | 6/2014 | Wang et al. | 707/769 |
| 8,977,600 B2 * | 3/2015 | Crupi et al. | 707/688 |
| 2007/0130226 A1 | 6/2007 | Banerjee et al. | |
| 2013/0073515 A1 | 3/2013 | Bhide et al. | |

(Continued)

FOREIGN PATENT DOCUMENTS

| | | |
|---|---|---|
| CN | 103970870 A | 8/2014 |
| WO | 2009037363 A1 | 3/2009 |

OTHER PUBLICATIONS

Bhagat et al., Comparative Study of Row and Column Oriented Database, 2012, IEEE, 196-201.*

(Continued)

*Primary Examiner* — Jean B Fleurantin
(74) *Attorney, Agent, or Firm* — Vierra Magen Marcus LLP

(57) ABSTRACT

A method for dynamically building a column store database from a row store database. The method includes establishing the row store database for storing data, wherein each row includes a plurality of attributes, and wherein data in row store database is current to a temporal point in time. The method includes establishing the column store database including data structured to satisfy received analytic queries. The method includes beginning from an initial state of the column store database, for each subsequently received analytic query, importing a targeted amount of data from a corresponding temporal state of the row store database into the column store database to satisfy the corresponding subsequently received analytic query.

17 Claims, 14 Drawing Sheets

(56) References Cited

U.S. PATENT DOCUMENTS

2013/0124578 A1     5/2013  Vangati et al.
2013/0166553 A1*    6/2013  Yoon et al. .................... 707/737
2013/0275365 A1*   10/2013  Wang et al. ................... 707/602
2014/0351233 A1*   11/2014  Crupi et al. ................... 707/706

OTHER PUBLICATIONS

International Search Report and Written Opinion dated Dec. 16, 2015 in International Patent Application No. PCT/CN2015/089573, 11 pages.
Supplementary Extended European Search Report issued in corresponding EP Application No. 15842381.4 dated Jun. 16, 2017, 6 Pages.

* cited by examiner

| EmpNo | Name | Gender | DeptNo. | StartDate | Title | Salary | Comment |
|---|---|---|---|---|---|---|---|
| 201 | 202 | 203 | 204 | 205 | 206 | 207 | 208 |

- Procedure ManagingCoveredRanges($L_A$, $INC_L$, $U_A$, $INC_U$)
-    if the already covered range is ($min$, $max$) then
-        return
-    end if
-    Search the bound values of the covered ranges and locate $L_A$ such that $L_i < L_A < L_{i+1}$;
-    if ($U_A < U_i$) then
-        return  /* case1: the query range is covered by interval $i$ */
-    end if
- 
-    Search the bound values of the covered ranges and locate $U_A$ such that $U_j < U_A < U_{j+1}$;
-    if ($L_A < U_i$) then
-        if ($U_A < L_{j+1}$) then  /* case 2: $L_A$ is in covered range, $U_A$ is not */
-            Consolidate intervals by forming a new one ($L_i$, $U_A$)
-        else /* case 3: $L_A$ is in covered range, $U_A$ is also in covered range */
-            Consolidate intervals by forming a new one ($L_i$, $U_{j+1}$)
-        end if
-    else
-        if ($U_A < L_{j+1}$) then
-            if ( i == j ) then /* case 4: Both $L_A$ and $U_A$ are in same uncovered range */
-                Add a new covered interval ($L_A$, $U_A$);
-            else   /* case 5: Both $L_A$ and $U_A$ are not in covered range. */
-                /* They are in different uncovered ranges */
-                Consolidate intervals by forming a new one ($L_A$, $U_A$);
-            end if
-        else  /* case 6: $L_A$ is not in covered range, $U_A$ is in covered range */
-            Consolidate intervals by forming a new one ($L_A$, $U_{j+1}$);
-        end if
-    end if
- end procedure

FIG. 5

Case 3: Combine interval 1, interval 2, and the gap to form ($L_1$, $U_2$)

Case 4: Add a new interval with range bounds ($L_A$, $U_A$)

Case 6: Combine interval 2, interval 3, and the gap to form $(L_A, U_3)$

METHOD AND SYSTEM FOR ADAPTIVELY BUILDING A COLUMN STORE DATABASE FROM A TEMPORAL ROW STORE DATABASE BASED ON QUERY DEMANDS

CROSS REFERENCE TO RELATED APPLICATIONS

This application is related to the commonly owned, patent application U.S. Ser. No. 14/489,050, entitled "METHOD AND SYSTEM FOR ADAPTIVELY BUILDING AND UPDATING A COLUMN STORE DATABASE FROM A ROW STORE DATABASE BASED ON QUERY DEMANDS," with filing date Sep. 17, 2014, which is herein incorporated by reference in its entirety. This application is also related to the commonly owned, patent application U.S. Ser. No. 14/489,192, entitled "STATEMENT BASED MIGRATION FOR ADAPTIVELY BUILDING AND UPDATING A COLUMN STORE DATABASE FROM A ROW STORE DATABASE BASED ON QUERY DEMANDS USING DISPARATE DATABASE SYSTEMS," with filing date Sep. 17, 2014, which is herein incorporated by reference in its entirety.

BACKGROUND

Based on the storage format of data records, a relational database system can have either row store or column store to save data records. In a row store database, data records are arranged in row format. A row store usually delivers good performance for online transaction processing (OLTP) transactions which often contain INSERT/DELETE/UPDATE operations. For instance, information can be changed for an entire row that involves one disk I/O operation. On the other hand, in a column store database, data records are arranged in column format. A column store delivers good performance for online analytical processing (OLAP) queries, as it need only read those columns necessary to process a query which also significantly reduces disk I/O operations.

Since row store and column store are good for different types of queries, it has been proposed to contain both row store and column store, i.e. hybrid row/column store, in a database system to handle a mixed workload. The goal is to achieve good OLTP performance and output real time (or almost real time) analytic results on a single database system. The common way to build a column store database from a row store database is to extract data records from row store, transform them, and load the data into attribute vectors for respective columns. That is, the column store is built statically before any analytic queries are received or executed. For example, an ETL (Extract-Transform-Load) process is executed during off-peak periods where the database is unavailable for online access in order to transfer the data to the column store database.

However, the typical approach to build a column store database is problematic as it necessarily overbuilds the database to include data that is irrelevant for any subsequent query or queries. In particular, it is often difficult to foresee which queries will be run on the database, and to which data those queries are directed. As such, the column store most likely will be over-built in order to accommodate all potential queries (e.g., building an attribute vector or column for every attribute in the row store database).

In addition, with increasing demand for constant access to database records by customers and companies located around the world, there is probably no good time window long enough to perform an ETL process to transfer data from row store into column store. That is, there are no longer any off-peak periods and not enough time to build a column store database without severely affecting the accessibility of the database system.

Furthermore, traditional hybrid row/column store database systems cannot provide real-time analytics. That is, analytic queries cannot be executed in real time, since the queries must wait for ETL operations to be completed during their scheduled times before query execution.

As such, existing hybrid row/column store database systems still rely on a predictive approach for guessing which attributes will be accessed during execution of queries, and tend to overbuild its column store databases before any query is received or executed. In addition, to facilitate speed of access, these traditional column store databases are built in main memory, such as random access memory (RAM), but will suffer a huge performance penalty during a system crash when the entire column store database is erased. As a result, the system remains down during a system recovery process, wherein the entire column store database is rebuilt.

It would be advantageous to build a column store database from a row store database that is not overbuilt for the queries requiring access to data, and that provides real-time query analytic execution.

SUMMARY

In some embodiments of the present invention, a computer system for dynamically building a column store database from a row store database is disclosed. The computer system includes memory having stored therein computer-executable instructions, and a processor executing the computer-executable instructions. The instructions include establishing a row store database for storing data, wherein each row of the row store database includes a plurality of attributes. The data in the row store database is current to a temporal point in time. The instructions include establishing a column store database including data structured to satisfy received analytic queries. The instructions include beginning from an initial state of the column store database, for each subsequently received analytic query, importing a targeted amount of data from a corresponding temporal state of the row store database into the column store database to satisfy the subsequently received analytic query.

In other embodiments, a method for accessing information is disclosed. The method includes establishing a row store database for storing data, wherein each row of the row store database includes a plurality of attributes. The data in the row store database is current to a temporal point in time. The method includes establishing a column store database including data structured to satisfy received analytic queries. The method includes beginning from an initial state of the column store database, for each subsequently received analytic query, importing a targeted amount of data from a corresponding temporal state of the row store database into the column store database to satisfy the subsequently received analytic query.

In still other embodiments of the present invention, a non-transitory computer-readable medium having computer-executable instructions for causing a computer system to perform a method for accessing information is disclosed. The method includes establishing a row store database for storing data, wherein each row of the row store database includes a plurality of attributes. The data in the row store database is current to a temporal point in time. The method includes establishing a column store database including data structured to satisfy received analytic queries. The method includes beginning from an initial state of the column store database, for each subsequently received analytic query, importing a targeted amount of data from a corresponding temporal state of the row store database into the column store database to satisfy the subsequently received analytic query.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

FIG. 2A is an exemplary illustration of a row entry of the employee table defined above, in accordance with one embodiment of the present disclosure.

FIG. 5 is a diagram of an exemplary algorithm implemented for managing metadata indicating what attribute vectors have been built in the column store database, and over what ranges of information are contained within those attribute vectors, in accordance with one embodiment of the present disclosure.

FIGS. 6A-F are illustrations of various examples of comparing covered intervals of an attribute vector to a query range, in accordance with embodiments of the present disclosure.

Figure 7:
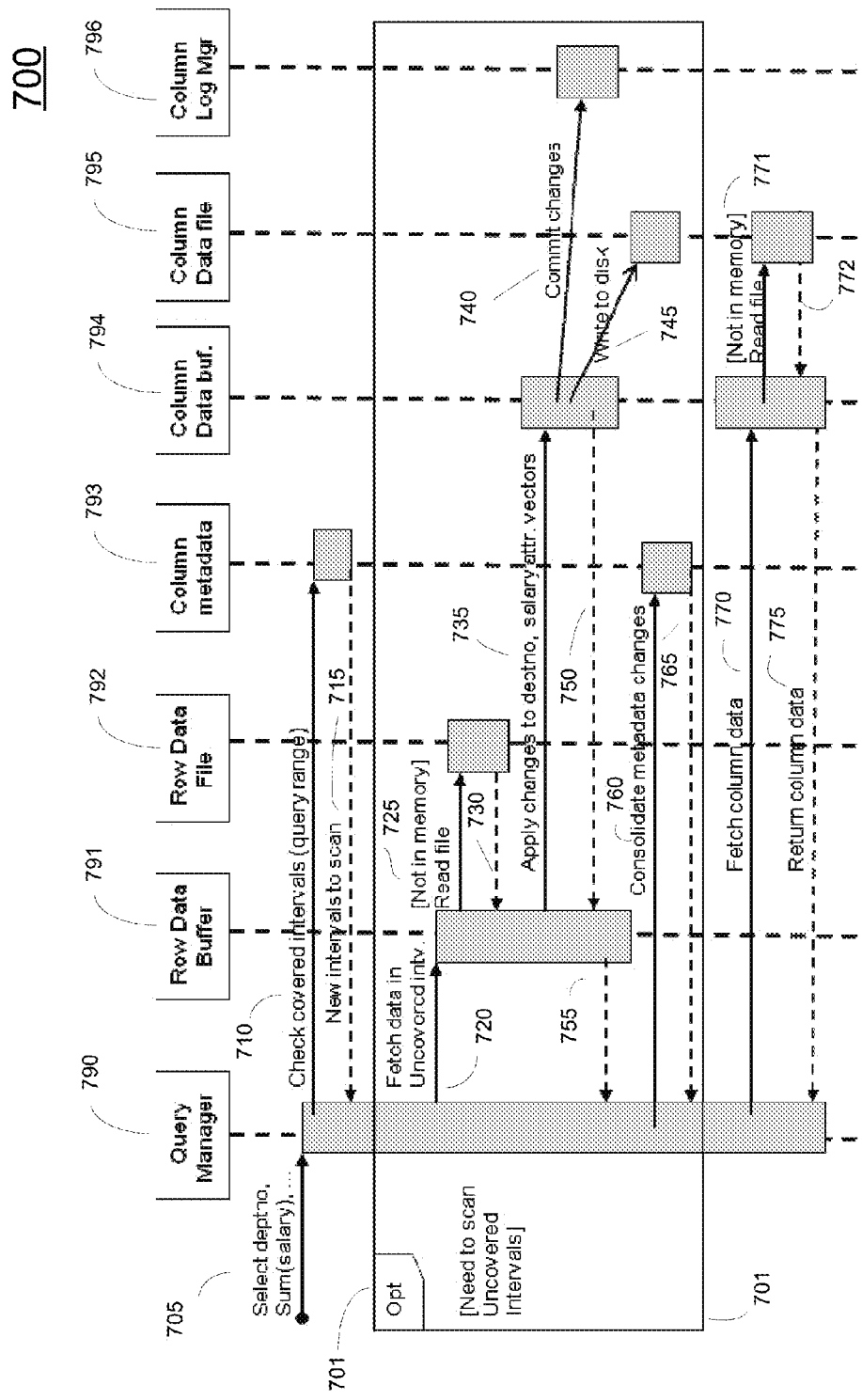

FIG. 7 is an illustration of a Unified Modeling Language (UML) sequence diagram for dynamically and adaptively building a column store database by importing data that is targeted to satisfy an executing query, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for adaptively building a column store database from a row store database to satisfy an analytic query directed to referenced attribute vectors or columns. Other embodiments of the present disclosure provide for building a column store database from a row store database that is not over-built with data not useful for the analytic queries accessing the database. Still other embodiments of the present disclosure provide for real-time execution of queries using a column store database adaptively built at run time for each of a plurality of received queries.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for providing video segmentation are described, according to embodiments of the present invention. Although specific steps are disclosed in the flowcharts, such steps are exemplary. That is, embodiments of the present invention are well-suited to performing various other steps or variations of the steps recited in the flowcharts. Also, embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Figure 1:
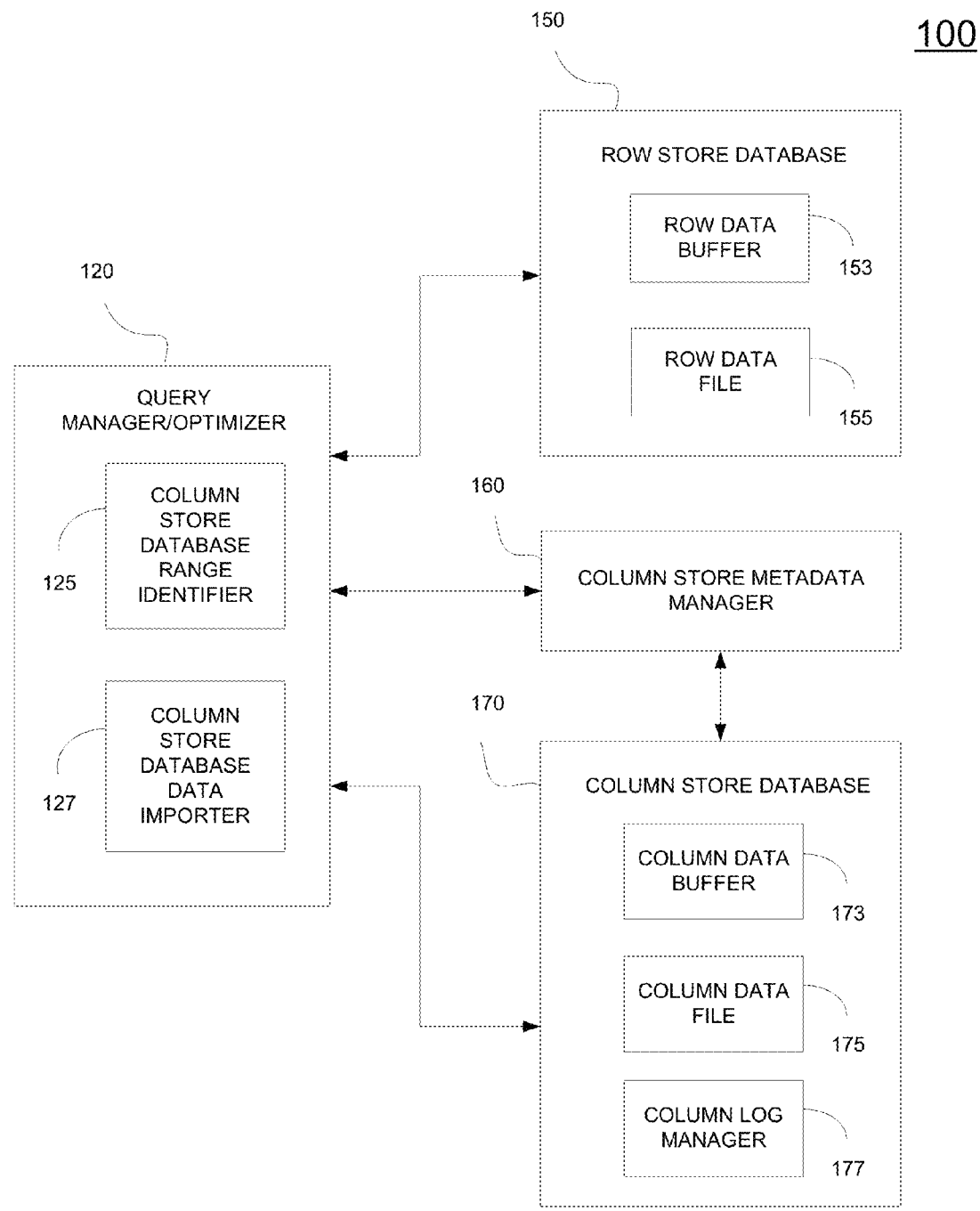
FIG. 1 is block diagram of a database system including a row store database and a column store database, wherein the column store database is built using an adaptive, just-in-time, and just-enough process, in accordance with one embodiment of the present disclosure.

FIG. 1 is block diagram of a database system 100 including a row store database 150 and a column store database 170, wherein the column store database 170 is built using an adaptive, just-in-time, and just-enough process, in accordance with one embodiment of the present disclosure. Specifically, the column store database 170 is built dynamically and progressively at run time for each received analytic query, and wherein the column store database is adaptively built to satisfy each query.

Database system 100 may include a processor and memory, wherein the processor is configured to execute computer-executable instructions stored in the memory, and wherein the processor is configured to build a column store database implementing an adaptive, just-in-time, and just-enough statement based migration process, in accordance with one embodiment of the present disclosure. In one embodiment, the processor is configured to execute processes outlined in FIGS. 3A-B, 5, and 7. For instance, the processor may be configured to perform the functions of one or more of the example embodiments described and/or illustrated herein, such as the operations performed by query/transaction manager 120. The processor may be included within a single or multi-processor computing device or system capable of executing computer-readable instructions. In its most basic form, a computing device may include at least one processor and a system memory. System memory is coupled to processor, and generally represents any type or form of volatile or non-volatile storage device or medium capable of storing data and/or other computer-readable instructions. Examples of system memory include, without limitation, RAM, ROM, flash memory, or any other suitable memory device.

For purposes of discussion, a "memory database system" or "main memory database system" refers to a database system including a CPU and "main memory", wherein the main memory is configured to hold all of the data in order to function properly. This is typical of traditional systems used for storing data. For example, a main memory may be comprised of random access memory (RAM). The main memory may be backed up with persistent storage, or with a battery back-up system. For purposes of illustration, a 100 GB main memory database system is configured to store all 100 GB in main memory.

On the other hand, embodiments of the present invention disclose a database system that allows data to be distributed in main memory and persistent storage, taken alone or in combination. For instance, in one embodiment, the majority of the data, if not all, is stored in persistent storage. That is, using the example of the 100 GB storage system, the data is stored in persistent storage, and main memory (e.g., 4 GB) is used for quicker access, such as, through a buffer. In that manner, a laptop is now a suitable medium for storing large amounts of data, whereas traditionally a laptop was unsuitable to be configured with 100 GBs of main memory. In still another embodiment, the data is stored in main memory for normal operation, and with a back-up to persistent storage.

Since row store and column store databases are good for different types of queries, embodiments of the present invention utilize a database system that includes both a row store database and column store database. Specifically, embodiments of the present invention provide for a hybrid row/column store access in a database system 100 to handle a mixed OLTP/OLAP workload. As a result, the hybrid row store and column store database system 100 achieves high OLTP performance, while enjoying real time (or almost real time) analytics result in a mixed workload environment.

As shown in FIG. 1, the database 100 includes a row store database 150. Each row of the row store database 150 includes a plurality of attributes. For example, row store database 150 may be defined as an employee table that includes eight attributes, wherein a table is a collection of records. For illustration, the employee table may include information related to the employees of a company, wherein the information is defined as attributes. A table definition is provided below that defines the attributes of an exemplary employee table, as follows:

```
CREATE TABLE Employee
(
    EmpNo int not null primary key,
    Name varchar(127) not null,
    Gender char(1) not null,
    DeptNo int not null,
    StartDate date,
    Title varchar(50) not null,
    Salary Decimal(10,2) null,
    Comment varchar(255) null,
    PRIMARY KEY (EmpNo),
    INDEX (Name),
    INDEX (DeptNo)
);
```

FIG. 2A is an exemplary illustration of a row entry 200A of the employee table defined above, in accordance with one embodiment of the present disclosure. For example, the employee table includes an attribute 201 for employee number, attribute 202 for employee name, attribute 203 for gender, attribute 204 for department number, attribute 205 for start date, attribute 206 for title, attribute 207 for salary, and a attribute 208 for comments.

The row store database 150 includes a row data buffer 153 configured to store data in non-persistent main memory, such as RAM. In addition, the row store database 150 includes a row data file 155, which persistently stores data, such as storing to disk. A row log manager (not shown) manages the updates and changes to the row store database 150.

In one embodiment, the row store database 150 is in a consistent database state. That is, the row store database 150 is current to a temporal point in time. For example, the row store database 150 can be configured as a static collection of data, and provides a snapshot of the data within the database.

In addition, the database system 100 includes a column store database 170 that includes data structured to satisfy received analytic queries. The column store database 170 includes a column data buffer 163 configured to store data in non-persistent main memory, such as RAM. In addition, the column store database 170 includes a column data file 165, which persistently stores data, such as storing to disk. A column store log manager 167 manages the updates and changes to the column store database 170.

In the column store database 170, there exists one attribute vector for each column or attribute that is referenced by any of a plurality of queries accessing the database system 100. The attribute vector includes one pair of information (e.g., RowID, value) for each scanned record of a table. The RowID uniquely identifies the related row entry that corresponds to the information in the column store database. In another embodiment, a primary key is used to reference row entries in the row store database, wherein the primary key is mappable to a corresponding RowID. In one embodiment, the value is an abbreviated/encoded internal representation of data that is defined with the help of dictionaries.

The covered range of an attribute vector in the column store database refers to the range of the primary key values, in accordance with one embodiment of the present disclosure. That is, a suitable range of primary key values can be used to define a covered range for any attribute vector. Like RowID, the primary key value can also uniquely identify a record. There exists a one-to-one mapping between RowID and primary key. For example, in the Employee Table provided above, the primary key is the Employee Number (EmpNo), which can be used to uniquely identify a row entry (e.g., through mapping) of a row store database. Each row entry uniquely corresponds to a different employee. When an analytic query needs to use a table scan operation, the attribute vector of the primary key column is built, even though the primary key is not referenced in a given query. This attribute vector provides mapping between the primary key values and corresponding RowID values. For a query involving full table scan operation, the covered range is only one single interval with all the possible values. For a query involving a partial table scan operation over a range of primary key values, then corresponding attribute vectors for the referenced attributes are built with a subset of records covering the range.

More specifically, beginning from an initial state of the column store database, for each subsequently received analytic query, a targeted amount of data is imported from a corresponding temporal state of the row store database into the column store database to satisfy the subsequently received analytic query. A query manager/optimizer 120 is configured to determine the targeted amount of data, if any, that is imported into the column store database 170 from the row store database 150. That is, the query manager/optimizer 120 is configured to determine the most efficient path for executing a query, including which data is referenced by the query. In particular, the query manager/optimizer 120 is configured for receiving a subsequently received analytic query, such as, any one of a sequence of received queries. The identified subsequently received analytic query is directed to a queried range of primary key attributes for a first referenced attribute (e.g., salary) in the plurality of attributes. For example, a query asking for the average salary of male employees with Employee Number greater than 8000 may access two attribute vectors (e.g., gender and salary) over a queried range of the primary key attribute (Employee Number) greater than 8000.

A range identifier 125 in the query manager/optimizer 120 is configured for determining if a covered range of primary key attributes associated with a corresponding attribute vector (e.g., first referenced attribute) of the column store database 120 is within or encompasses the queried range of primary key attributes. In particular, the range identifier 125 communicates with the column store metadata manager to access metadata including state information for the metadata. That is, the metadata includes state information related to what attribute vectors have been built in the column store database 170. More particularly, the metadata includes a covered range (e.g., primary key attributes) corresponding to each attribute vector in the column store database. In that manner, a determination can be made by the query manager/optimizer 120 whether or not the covered range encompasses the queried range to satisfy the query.

When the covered range of primary key attributes, as stored in the column store database 170 for an attribute vector of a first referenced attribute, encompasses the queried range, then no enhancement is necessary, as the data contained within the column store database 170 is sufficient to satisfy the query. That is, the targeted amount of data to be imported is a null set of data, such as, when the column store database includes data that is sufficient to satisfy the query.

On the other hand, when the covered range of primary key attributes as stored in the column store database 170 for an attribute vector of a first referenced attribute does not encompass the queried range, then the covered range is enhanced in order to satisfy the query. In one embodiment, the enhancement includes importing a targeted amount of data that comprises a minimum amount of data, or just-enough data to support and satisfy the currently executing analytic query. Using the example query asking for the average salary of males with Employee Number (EmpNo) greater than 8000, an attribute vector including salary information may include information with Employee Number greater than 9000. In that case, the covered range (the Employee Number greater than 9000) does not encompass the queried range (Employee Number greater than 8000) of the attribute vector for salary. As such, the attribute vector for salary is enhanced with the targeted data so that the covered range of primary key attributes will encompass the queried range of primary key attributes for that referenced attribute. The targeted data that is imported to the column store database includes salary information for Employee Number from 8000 to 9000. More specifically, a data importer 127 of the query manager/optimizer 120 is configured for importing the targeted data from the row store database 150, in the corresponding temporal state, to enhance the covered range for the attribute vector in order to encompass the queried range.

When the covered range of primary key attributes for a referenced attribute is a null set, then the attribute vector for the referenced attribute is built from the row store database. That is, values over the queried range of primary key attributes are used to build the attribute vector for the referenced attribute.

In one embodiment, the targeted amount of data comprises a minimum amount of data, or just-enough data to support and satisfy the currently executing analytic query. In some embodiments, the targeted amount of data is a null set of data, such as, when the column store database includes data that is sufficient to satisfy the query.

Figure 3A:
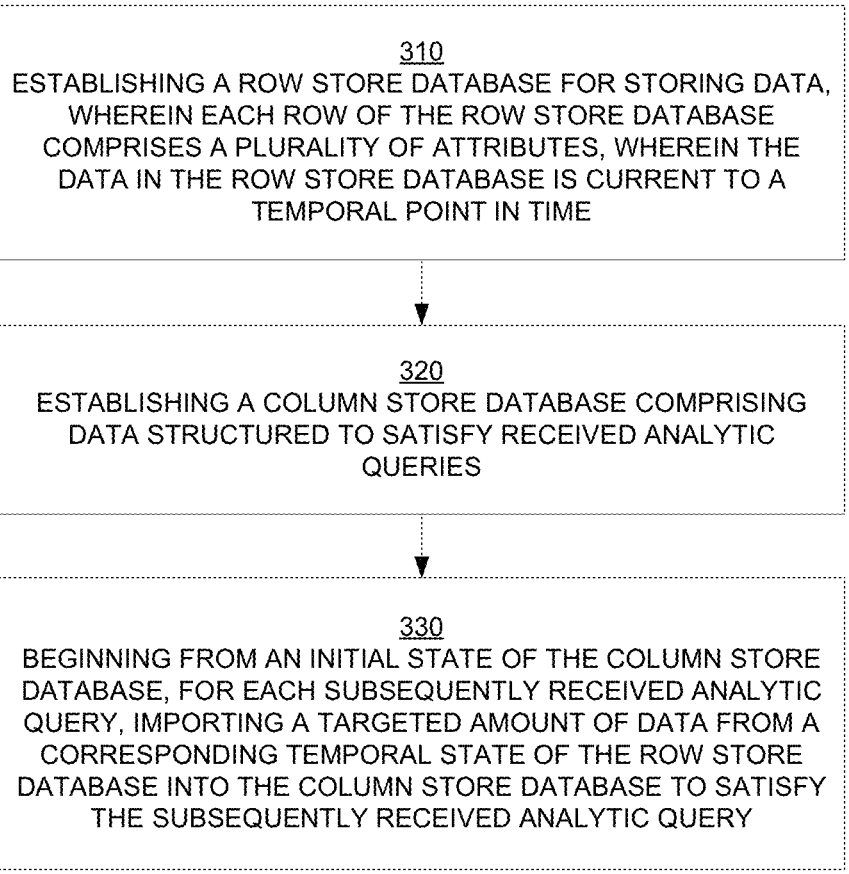
FIG. 3A is a flow diagram illustrating a method for accessing data from a column store database built from a row store database using an adaptive, just-in-time, and just-enough process, in accordance with one embodiment of the present disclosure.

FIG. 3A is a flow diagram 300A illustrating a method for accessing information from a column store database, in accordance with one embodiment of the present disclosure. In one embodiment, flow diagram 300A illustrates a computer implemented method for accessing information from a column store database. In another embodiment, flow diagram 300A is implemented within a computer system including a processor and memory coupled to the processor and having stored therein instructions that, if executed by the computer system causes the system to execute a method for accessing information from a column store database. In still another embodiment, instructions for performing the method are stored on a non-transitory computer-readable storage medium having computer-executable instructions for causing a computer system to perform a method for accessing information from a column store database. The operations of flow diagram 300A are implemented within the database system 100, query manager/optimizer 120, and system 800 of FIGS. 1 and 8, respectively, in some embodiments of the present disclosure.

At 310, the method includes establishing a row store database for storing data, wherein each row of the row store database comprises a plurality of attributes. In one embodiment, the row store database is the source of truth. That is, the row store database is the source for data from which other databases may be built, such as, the column store database.

In addition, the state of data in the row store database is current to a temporal point in time. That is, with reference to the temporal point in time, the row store database does not include changes to the information (e.g., INSERT/DELETE/UPDATE operations) performed after that temporal point in time. In one case, the row store database current to a temporal point in time is generated from and is a subset of a database that contains up-to-date information for a given temporal point in time.

Figure 2B:
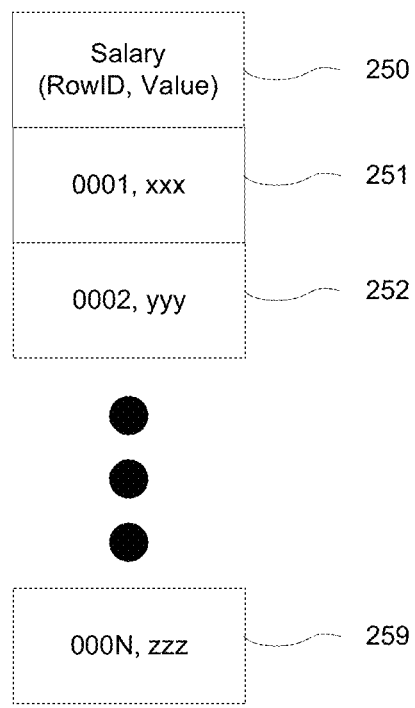
FIG. 2B is an illustration of an exemplary attribute vector for the salary attribute of the employee table shown in FIG. 2A, in accordance with one embodiment of the present disclosure.

At 320, the method includes establishing a column store database comprising data structured to satisfy received analytic queries. The column store database contains a collection of attribute vectors for a table. More particularly, there exists one attribute vector for each column or attribute that is referenced by any of a plurality of queries accessing the database system. As previously described, the attribute vector includes a pair of information (e.g., RowID, value; or primary key, value) for each scanned record of a table (e.g., row store database). FIG. 2B is an illustration of an exemplary attribute vector 200B for the salary attribute of the employee table 200A, in accordance with one embodiment of the present disclosure. As shown in information block 250 for the attribute vector 200B containing salaries, each entry in the column includes a RowID that identifies the related row entry in the row store database, and a value representing the salary of the corresponding employee. For example, in field 251, the row entry is "0001" with a salary of "xxx"; in field 252 the row entry is "0002" with a salary of "yyy"; and for field 259, the row entry is "000N" with a salary of "zzz".

An attribute vector of the column store database is derived from a corresponding row store database dynamically and adaptively during scan operations of run time queries, in one embodiment. More specifically, at 330, the method includes beginning from an initial state of the column store database, for each subsequently received analytic query, importing a targeted amount of data from a corresponding temporal state of the row store database into the column store database to satisfy the subsequently received analytic query. Specifically, during the import of targeted information, a scan operation (either full table scan or partial table scan) on the row store database is performed to build/enhance the attribute vector for each referenced column in the column store when a query is executed on a row store. In general, the first set of analytic queries will be slower, as the attribute vectors over their required ranges are progressively built. However, later analytic queries will be executed quickly using existing attribute vectors in the column store and without importing targeted data. The process for importing targeted data is described more fully with respect to FIG. 3B below.

Figure 3B:
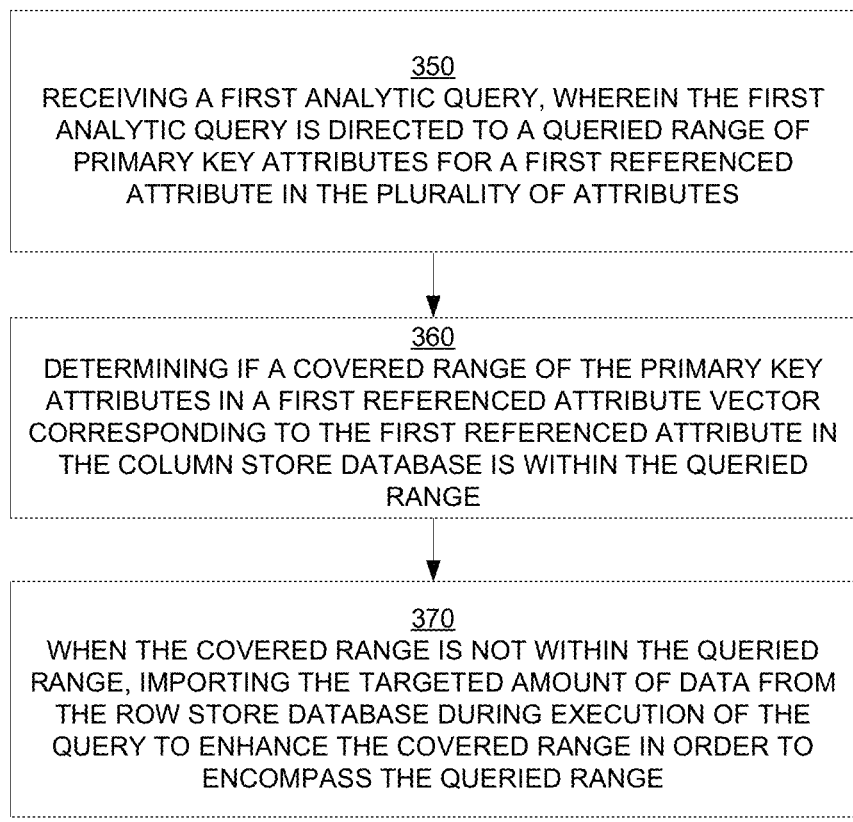
FIG. 3B is a flow diagram illustrating a method for providing real-time analytical results from a query by dynamically and adaptively building a column store database by importing data that is targeted to satisfy an executing query, in accordance with one embodiment of the present disclosure.

FIG. 3B is a flow diagram 300B illustrating a method for providing real-time analytical results from a query by dynamically and adaptively building a column store database by importing data that is targeted to satisfy an executing query, in accordance with one embodiment of the present disclosure. In one embodiment, flow diagram 300B illustrates a computer implemented method for dynamically and adaptively building a column store database by importing data that is targeted to satisfy an executing query. In another embodiment, flow diagram 300B is implemented within a computer system including a processor and memory coupled to the processor and having stored therein instructions that, if executed by the computer system causes the system to execute a method for dynamically and adaptively building a column store database by importing data that is targeted to satisfy an executing query. In still another embodiment, instructions for performing the method are stored on a non-transitory computer-readable storage medium having computer-executable instructions for causing a computer system to perform a method for dynamically and adaptively building a column store database by importing data that is targeted to satisfy an executing query. The operations of flow diagram 300B are implemented within the database system 100, query manager/optimizer 120, and system 800 of FIGS. 1 and 8, respectively, in some embodiments of the present disclosure.

The process outlined in flow diagram 300B is implemented to build a column store adaptively to received analytic queries, dynamically and just-in-time to handle the received queries, and builds the column store database with just-enough data to service each received analytic query imported from a consistent database state (e.g., temporal state) of the row store database.

In particular, flow diagram 300B is implemented upon receipt and execution of an analytic query to adaptively and dynamically build/enhance attribute vectors of the column store database. At 350, the method includes receiving a first analytic query, wherein the first analytic query is directed to a queried range of primary key attributes for a first referenced attribute vector corresponding to a first referenced attribute in the plurality of attributes. The first analytic query is representative of any of a sequence of analytic queries received and configured for accessing data originally contained within a row store database. More particularly, the first analytic query is referencing one or more columns during its execution or run, to include data within a queried range of primary key attributes for each referenced attribute and its attribute vector. For instance, a query manager/optimizer (e.g., manager 120 of FIG. 1) is configured to determine which attribute vector(s), and over what ranges, are referenced by the first analytic query. For a specific query, the queried range of primary key attributes applies to each of the attribute vectors referenced by that query.

In one embodiment, an attribute vector is built when a column is referenced in a run time query and a table scan operation is first invoked to fetch table records. Different attribute vectors corresponding to different columns may be built at different times depending on when they are referenced in run time queries. An attribute vector can be enhanced later if an additional range is referenced in a subsequent query.

In one embodiment, for the columns that are not referenced in any received analytic queries except the primary key attribute, there is no need to create a corresponding attribute vector and load them into the column store database. In addition, for data records never scanned during scan operations (i.e. they are not in the range predicate) performed to satisfy a queried range, those data records are not included in the attribute vectors of the column store database. As such, the column store database is never over-built with any data not useful for any received analytic queries. Compared with the static-built column store (e.g., ETL), embodiments of the present invention disclosing the adaptively and dynamically built attribute vectors of a column store database are more efficient in terms of storage requirement since no resources are expended for storing data not referenced during any received analytic queries.

At 360, the method includes determining if a covered range of the primary key attributes in a first referenced attribute vector corresponding to a first referenced attribute in the column store database is within the queried range of primary key attributes. For example, a covered range of the salary attributes within the first attribute vector may contain information with Employee Number greater than 8000. The queried range defines the range of information requested by the query. For instance, the queried range may be directed to salary information with Employee Number (e.g., primary key range) greater than 9000, in which case, the queried range is encompassed by the covered range. In other cases, the queried range may not be encompassed by the covered range in the attribute vector. For example, the queried range may be directed to salary information with Employee Number greater than 5000. As such, portions of the queried range are not encompassed by the covered range, specifically, information with Employee Number between 5000 and 8000, which is the targeted amount of data.

In one embodiment, metadata is generated and stored that tracks attribute vectors and their record or covered ranges that are built in the column store database. The method outlined in flow diagram 300B includes accessing the metadata comprising information related to each attribute vector in the column store database and a covered range (e.g., range of primary keys) corresponding to each attribute vector in the column store database in order to determine if the covered range of a referenced attribute vector encompasses the queried range of the first analytic query. For example, the query manager/optimizer is configured to access and consult the metadata to determine which attribute vectors, and over what ranges, are referenced for each analytic query. If the column store database contains the whole data set for a query, then the query manager/optimizer is configured to direct the query to access the column store database directly.

On the other hand, if the column store database does not contain the whole data set for a query, then the query manager/optimizer is configured to enhance the column store database with targeted data that is imported in order to satisfy the query. More specifically, at 370, when the covered range of primary key attributes is not within the queried range of primary key attributes for a referenced attribute vector of a referenced attribute, the method includes importing the targeted amount of data from the row store database during execution of query to enhance the covered range in order to encompass the queried range and to satisfy the first analytic query.

In particular, when executing the query, a scan operator is normally utilized to access data in the row store database. Embodiments of the present invention are able to piggyback on top of the operations performed by the scan operator to build/enhance the attribute vector for each referenced column in the column store when a query is executed on a row store database. A scan operation performed by the scan operator can touch either all of records of a table by performing a full table scan, or a portion of records in a table by performing a partial table scan in embodiments of the present invention. As such, either a full table scan or a partial table scan may be performed (e.g., by a scan operator) to access the targeted amount of data imported to the column store database.

In a column store database, the table data are saved by columns, with one file per column. As such, only one disk I/O is performed when accessing a column of data. When a new record with ten columns is added to a table, the system needs to modify ten files in a column store. In one embodiment, batch processing of records is performed in order to speed up making the modification to the column store database.

In one embodiment, metadata relating to the attribute vectors in the column store database are updated to reflect changes, wherein the metadata includes information related to each attribute vector in the column store database and a covered range (e.g., range of primary keys) corresponding to each attribute vector in the column store database. In particular, the covered ranges of the attribute vectors are updated to reflect the targeted amount of data imported to satisfy the query.

Once the column store is modified with the targeted amount of data imported to satisfy the first analytic query, the method includes persistently storing the column store database to disk, in one embodiment. In that manner, when the database system fails, even though the column store database that exists in main memory (e.g., buffer or RAM) may also fail, a copy of the column store database is stored in non-volatile memory (e.g., disk), from which recovery can be performed.

In embodiments of the present invention, the first set of analytic queries received will be executed more slowly than later subsequent analytic queries. This is because the attribute vectors are newly created and the covered ranges are established. However, as the attribute vectors for the column store database are built progressively with each successive analytic query received and executed, the execution of later received analytic queries will be faster as the attribute vectors have already been built in the column store database, and may or may not need enhancement to satisfy the corresponding query.

Full Table Scan

For illustration purposes only, the following sequence of analytic queries as executed is performed on the employee table, previously introduced and wherein a row entry 200A is described in FIG. 2A. In the example, a first analytic query in the sequence that is posed to analyze data contained within the employee table or row store database (e.g., the database containing row entry 200A of FIG. 2A) is presented as a SQL statement, as follows: "SELECT SUM(salary) FROM Employee;". This query is directed to the salary attribute of one or more attributes of the row store database. For efficiency, embodiments of the present invention access the salary information from a corresponding attribute vector or column containing salary information, such as that represented in FIG. 2B. In one embodiment, a full table scan is performed to access the targeted amount of data imported into corresponding attribute vector(s) in the column store database to satisfy query. For example, an attribute vector is built for the salary column.

Continuing with the example, a second analytic query in the sequence is presented, as follows: "SELECT Name FROM Employee WHERE StartDate>'mm/dd/yyyy';". In the case where there is no secondary index on the StartDate column in the row store, the query manager/optimizer will direct the system to scan the entire table to fetch Name values. As such, an attribute vector will be built for the Name column and contains employee name attributes, and another attribute vector will be built for StartDate column and contains employee start dates. In the sequence presented, the Name and StartDate attribute vectors are built after the salary attribute is built during the previous query. This example shows that attribute vectors are built adaptively and just-in-time for run time queries.

For the columns, or ranges of columns, that are not referenced in the received analytic queries, there is no need to create and load them into the column store database in one embodiment. That is, with the adaptive and just-in-time approach of building attribute vectors for the column store database to satisfy run time queries, the column store database is not over-built with any columns that are not referenced or useful for any of the received analytics queries. For example, the 'Comment' column in the employee table, previously presented, will not appear in the column store if it is not referenced in any analytics queries.

In one embodiment, when the database system utilizes a secondary index to fetch records, it is not necessary to build the attribute vector using the secondary index access method. That is, the secondary index can be used when the system needs to fetch only a handful of records from the row store database. This is because the column store database does not show good performance benefits when only a handful of records are needed. For this query, the database system can fetch records from row store directly. Continuing with the example, a third analytic query in the sequence is presented, as follows: "SELECT * FROM Employee WHERE EmpNo=2001;". This select query just retrieves one record (e.g., for employee number 2001) from the row store database using the primary index without a full table scan. In this case, the database system just fetches the record from row store directly. There is no need to build/enhance column store when executing this query.

Partial Table Scan

A partial table scan can be used to access the row store database when building an attribute vector of a column store database to satisfy a query. A new sequence of queries is presented for illustration purposes only to illustrate the use of a partial table scan operation. For instance, the following sequence of analytic queries as executed is performed on the employee table, previously introduced and wherein a row entry 200A is described in FIG. 2A. In the example, a first analytic query in the sequence that is posed to analyze data contained within the employee table or row store database (e.g., the database containing row entry 200A of FIG. 2A) is presented as a SQL statement, as follows:

SELECT EmpNo, Name, DeptNo, Title FROM Employee WHERE EmpNo>8000;

In one embodiment, the database system utilizes a primary key/index to fetch records to build a corresponding attribute vector for a referenced attribute, especially when a large amount of records is accessed. For the above query, when importing a targeted amount of data for the columns containing information after the employee number of 8000, the primary key/index may be used to fetch those salary records, rather than performing a full table scan. If a query performs a sequential scan on a table partially, then the referenced attribute vector or vectors are built for those records that are scanned. That is, those attribute vectors are originally created. These attribute vectors can be enhanced when the rest of records are scanned in the future when executing subsequent queries.

Figure 4:
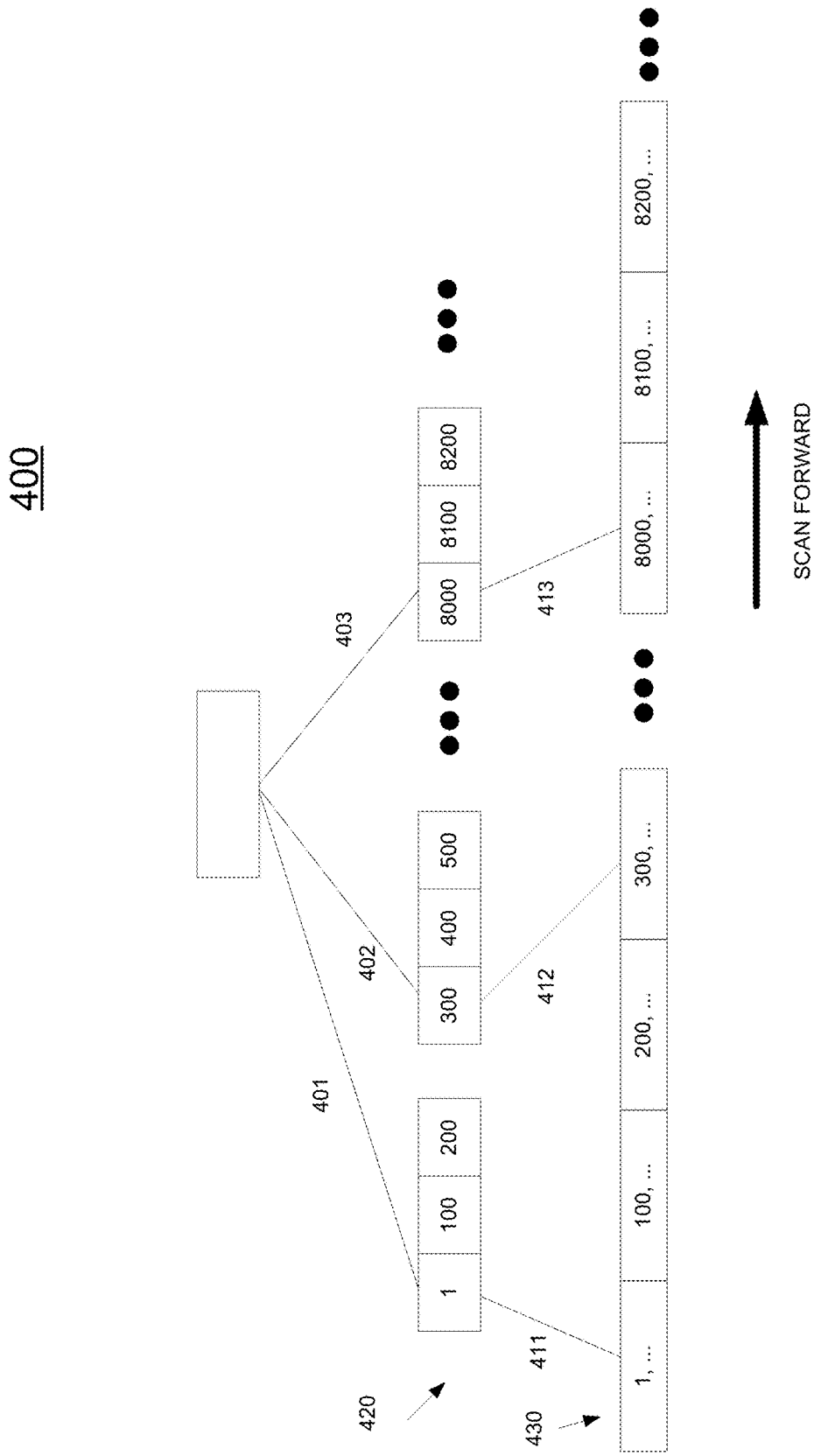
FIG. 4 is an illustration of a B-tree of the employee table, wherein a primary index is used to perform a partial table scan when adaptively building a referenced attribute vector in a column store database, in accordance with one embodiment of the present disclosure.

Suppose the previously introduced employee table has a B-tree like clustered index on a primary key column EmpNo in the row store database. For example, FIG. 4 is an illustration of a B-tree 400 of the employee table, wherein a primary index is used to perform a partial table scan when adaptively building a referenced attribute vector in a column store database, in accordance with one embodiment of the present disclosure. The first layer includes pointers to various fields in the second layer 420 containing employee identifiers. Pointers in the second layer provide access to various fields in the third layer containing the entire employee record.

As shown, the primary key is the employee identifier, which is defined in the fields of the second layer 420. Portions of the B-tree 400 can be referenced by using the proper primary key/index. For example, the record for employee number identifiers 1, 100 and 200 can be reached by following the pointer 401 for the primary index for employee 1, and then following the pointer 411 to reach the records. Also, the record for employee identifiers 300, 400, and 500 can be reached by following the pointer 402 for the primary index for employee 300, and then following the pointer 412 to reach the records. Further, the record for employee identifiers 8000, 8100, and 8200 can be reached by following the pointer 403 for the primary index for employee 8000, and then following the pointer 413 to reach the records.

The above query can be executed using a partial table scan to access referenced data. The partial table scan is performed by first locating the Employee record with the primary key of 8000, and then scanning forward. If this is the first time to partial scan Employee table, then attribute vectors are created for EmpNo, Name, DeptNo, and Title for those records great than 8000 in EmpNo column. Metadata is also saved on the available range and covered range of an attribute vector.

Continuing with the example, a second analytic query in the sequence is presented, as follows:

SELECT EmpNo, Name, DeptNo, Title FROM Employee WHERE EmpNo>9000;

Since the queried range with EmpNo greater than 9000 as referenced by the query is within the covered range of the attribute vector for EmpNo greater than 8000, there is no need to enhance the attribute vector. This is because the covered range encompasses the queried range.

Continuing with the example, a third analytic query in the sequence is presented, as follows:

SELECT EmpNo, Name, DeptNo, Title FROM Employee WHERE EmpNo>5000;

Since the queried range with EmpNo greater than 5000 as referenced by the query is not within the covered range of the attribute vector for EmpNo greater than 8000, there is now a need to enhance the attribute vector. This is because the queried range is a superset of the covered range. As such, the covered range of the attribute vector for EmpNo needs to be enhanced with records from EmpNo 5000 to EmpNo 8000.

For records not scanned in sequence of analytic queries, such as those records with EmpNo less than 5000 in the above case, there is no need to build or enhance attribute vectors with data corresponding to records for EmpNo less than 5000, in embodiments of the present invention. That is, in the adaptive and just-enough approach to building a covered range of an attribute vector, the column store database is not built using any data records that are not useful or reverend by any received analytic queries.

Metadata

In embodiments of the present invention, the adaptive, just-in-time, and just-enough approach to building the column store database references metadata including information about the attribute vectors in the database. For instance, the metadata indicates what attribute vectors have been built in the column store database, and over what ranges of information (e.g., primary key ranges) are contained within those attribute vectors. As a result, the query manager/optimizer is configured to consult the metadata at analytic query run time to decide whether or not there is a need to build/enhance the referenced attribute vectors. For example, if the column store database contains the whole data set referenced by a query, then query manager/optimizer directs the query to access the column store directly.

FIG. 5 is a diagram of an exemplary algorithm 500 implemented for managing metadata indicating what attribute vectors have been built in the column store database, and over what ranges of information (e.g., primary key ranges) are contained within those attribute vectors, in accordance with one embodiment of the present disclosure. The operations of algorithm 500 are implemented within the database system 100, metadata manager 160, and system 800 of FIGS. 1 and 8, respectively, in some embodiments of the present disclosure.

Suppose min represents the minimal possible value of a cluster index (a.k.a. primary key), and max represents the maximal possible value of the same cluster index. All the covered ranges (e.g., ranges of a primary key) for attribute vectors need to be reflected in the metadata. In particular, for each covered interval i, two range points are saved ($L_i$, $U_i$), where $L_i$ is the lower bound value and $U_i$ is the upper bound value.

The selection predicates in a SQL query can be decomposed into one or multiple disjoint ranges unionized by the OR operator. Each disjoint range having a continuous interval can have one of the following formats: 1) range condition (A<v) can be canonically represented as (min<A<v); 2) range condition (A>v) can be canonically represented as (v<A<max); and 3) range condition '(A>u) AND (A<v)' can be represented as (u<A<v).

If the entire table range is included, the range of the covered interval (e.g., the range over primary keys) is set as (min, max). When the entire table is covered, then the process for determining and storing metadata should exit early since there are no more changes to the covered intervals.

Conditions of the algorithm 500 include merging a query range predicate $L_A<A<U_A$ on clustered index A with the already covered ranges (e.g., primary key ranges). Another condition includes using $INC_L$ to indicate whether $L_A$ is inclusive or not. That is, when $INC_L$ is true, the one-sided range condition is $L_A<=A$; otherwise, it is $L_A<A$. Still another condition includes using $INC_U$ to indicate whether $U_A$ is inclusive or not. Another condition includes using min to represent the minimal possible primary key value of a table, and using max to represent the maximal possible primary key value of a table. Still another condition includes for a covered interval in the metadata, defining $L_i$ as the lower bound for interval i and $U_i$ as the upper bound of the covered interval i.

As shown in algorithm 500, the lower bounds and upper bounds of all the disjoint covered intervals (e.g., primary key ranges) are in sequence order with the following property: $L_1<U_1<L_2<U_2<L_3<U_3<\ldots$. For most cases, it is not expected to take many intervals of executing queries to sufficiently build up the attribute vectors of the column store database before subsequent queries are executed quickly. It is expected that the covered intervals of a column may consolidate to one interval (min, max) before long. Once it covers the entire column with (min, max), there are no more changes to the metadata for a given column or attribute vector. Therefore, a simple one-dimensional array (or vector) is sufficient to contain all the bound values of the covered intervals, in one embodiment. In case there are many covered intervals, a binary tree may be used, such as AVL-tree, to contain all the lower/upper bound values so that $L_A$ and $U_A$ may be quickly located for a query range predicate.

FIGS. 6A-F are illustrations of various examples of comparing covered intervals (e.g., primary key ranges) of an attribute vector to a query range, in accordance with embodiments of the present disclosure.

Figure 6A:
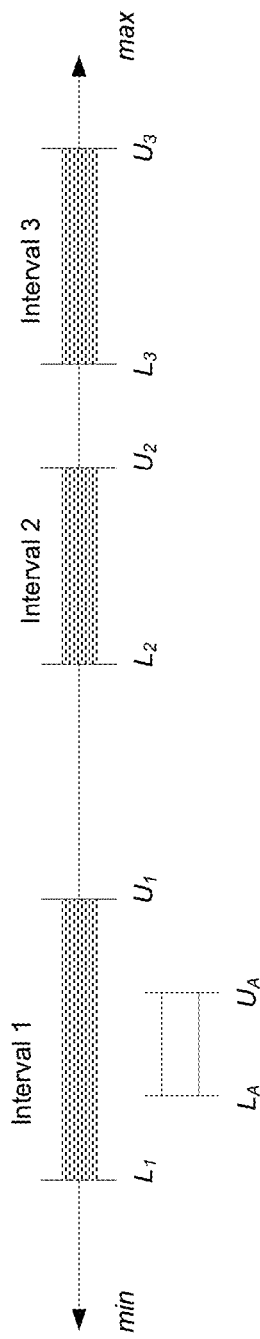

As shown in FIG. 6A, for Case 1 an attribute vector 600 includes information over a range (e.g., of primary keys) between min and max. The covered range includes interval 1, having a lower bound of $L_1$ and an upper bound of $U_1$. The covered range also includes interval 2, having a lower bound of $L_2$ and an upper bound of $U_2$. The covered range also includes interval 3, having a lower bound of $L_3$ and an upper bound of $U_3$. In Case 1, the queried range has a lower bound of $L_A$ and an upper bound of $U_A$. Because the queried range is entirely contained in interval 1, there is no change to metadata, and the attribute vector 600 is sufficient to satisfy the query without importing addition data.

Figure 6B:
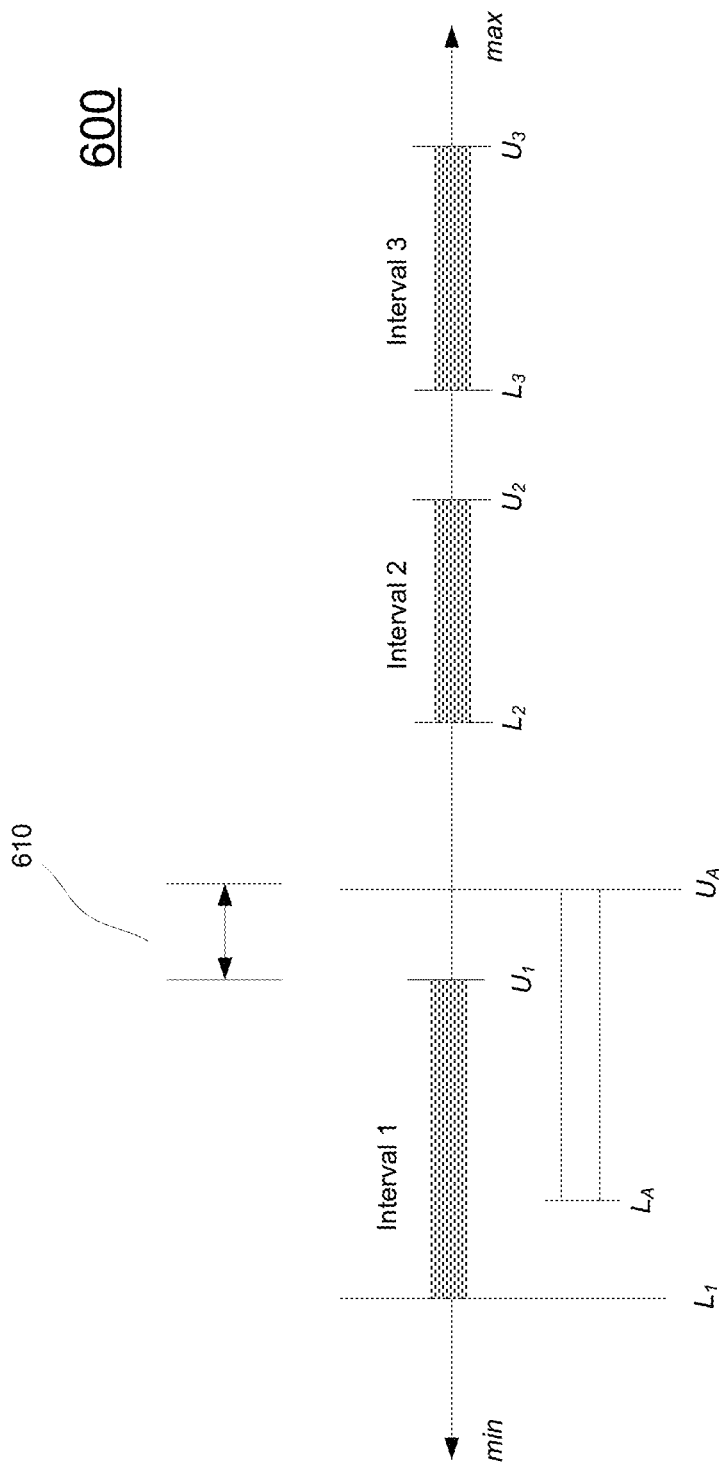

As shown in FIG. 6B, for Case 2, the queried range ($L_A$, $U_A$) now overlaps with interval 1, such that the covered range does not sufficiently encompass the queried range. For example, the lower bound $L_A$ of the queried range resides within interval 1, while the upper bound $U_A$ resides outside any of intervals 1-3 in an uncovered space. When the query runs, the attribute vector 600 is enhanced with records in the range ($U_1$, $U_A$) in the enhancement zone 610. In the metadata, the bounds of interval 1 are revised to ($L_1$, $U_A$) of the newly formed continuous interval. That is, the upper bound of interval 1 is modified to $U_A$.

Figure 6C:
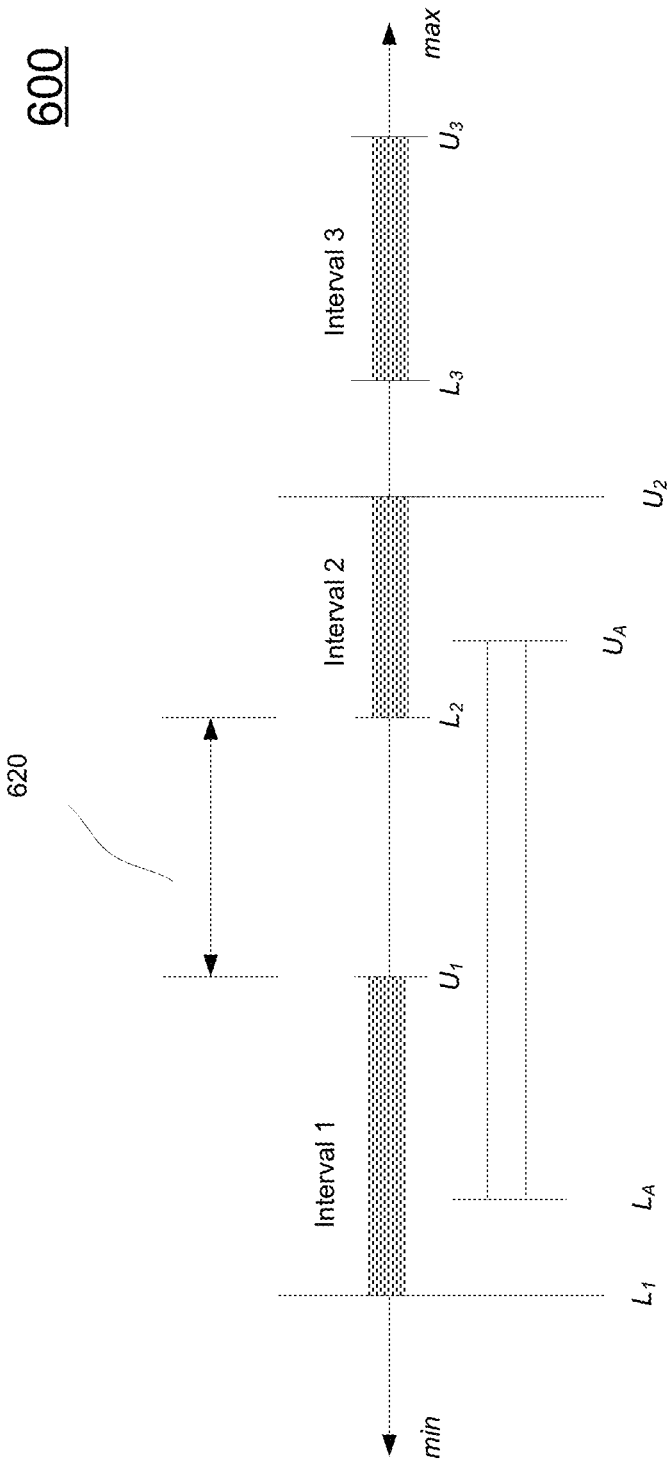

As shown in FIG. 6C, for case 3 the queried range ($L_A$, $U_A$) overlaps with two intervals: interval 1 and interval 2. The lower bound $L_A$ of the queried range resides in interval 1, while the upper bound $U_A$ resides in interval 2. When the query runs, the attribute vector 600 is enhanced with records in the range ($U_1$, $L_2$) in the enhancement zone 620. In metadata, both interval 1 and interval 2 is replaced with a new continuous interval having the range ($L_1$, $U_2$). For instance, the upper bound of interval 1 may be modified to $U_2$, while interval 2 is erased. Also, equally effective, the lower bound of interval 2 may be modified to $L_1$, while interval 1 is erased.

Figure 6D:
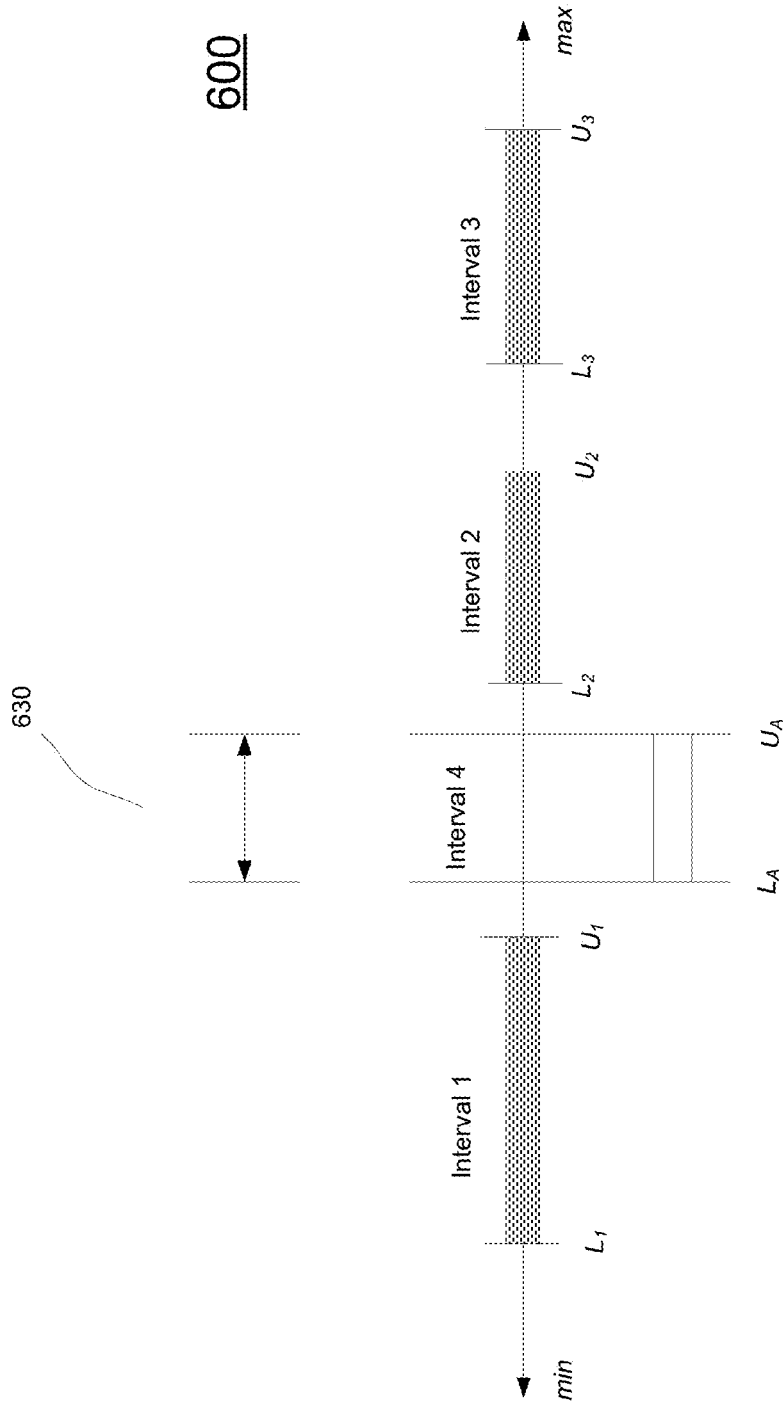

As shown in FIG. 6D, for case 4 the queried range resides entirely in a single uncovered interval, as shown in the enhancement zone 630. When the query runs, the attribute vector 600 is enhanced with records in the range ($L_A$, $U_A$), shown in enhancement zone 630. The metadata includes a new interval 4 with range ($L_A$, $U_A$).

Figure 6E:
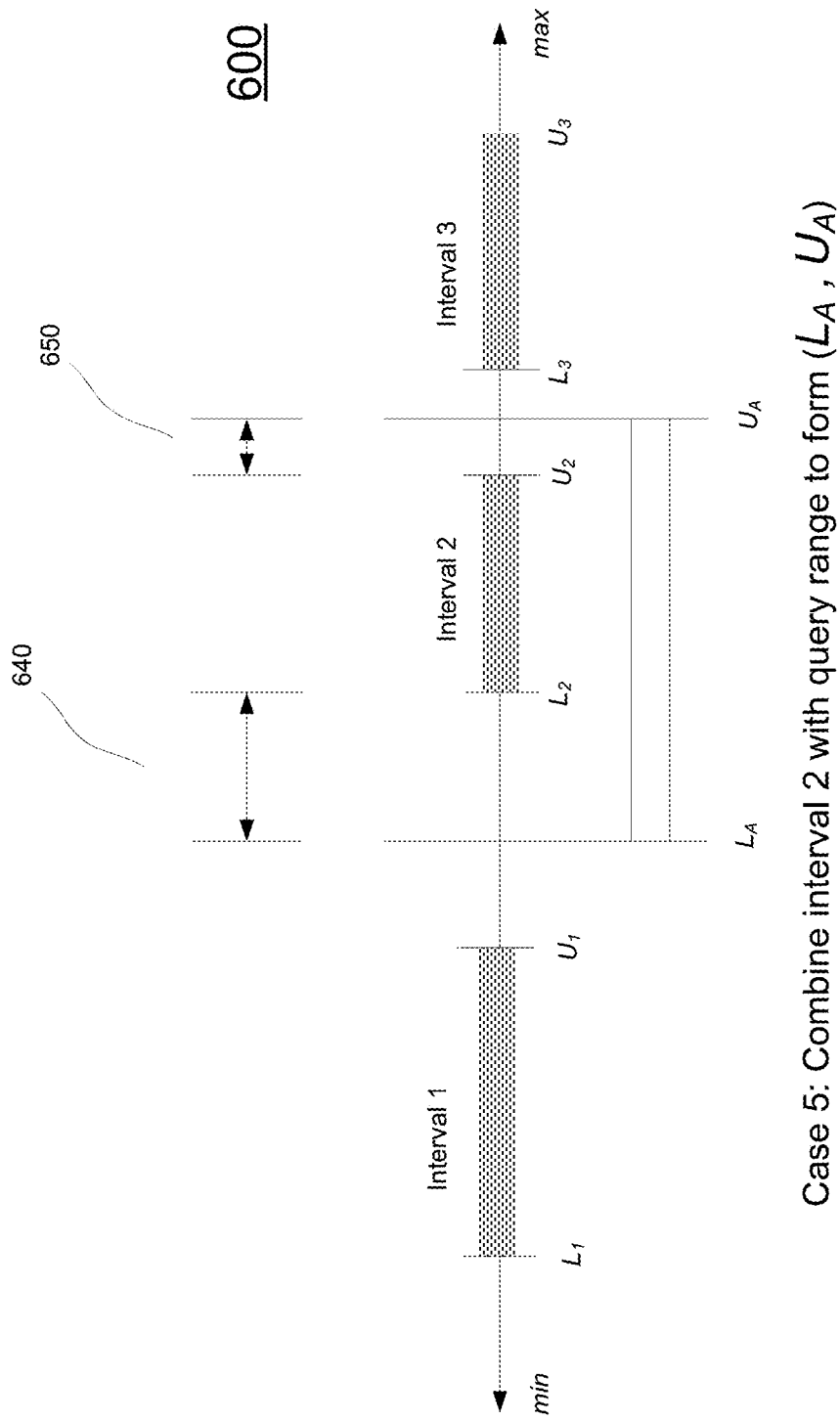

As shown in FIG. 6E, for case 5, the queried range ($L_A$, $U_A$) entirely covers interval 2. However, both the lower bound $L_A$ and the upper bound $U_A$ reside in different uncovered intervals. For example, the lower bound $L_A$ resides between interval 1 and interval 2, and the upper bound $U_A$ resides between interval 2 and interval 3. When the query runs, the attribute vector 600 is enhanced with records in the range ($L_A$, $L_2$) of enhancement zone 640, and records in the range ($U_2$, $U_A$) of enhancement zone 650. In metadata, we replace interval 2 with a new interval having the range ($L_A$, $U_A$).

Figure 6F:
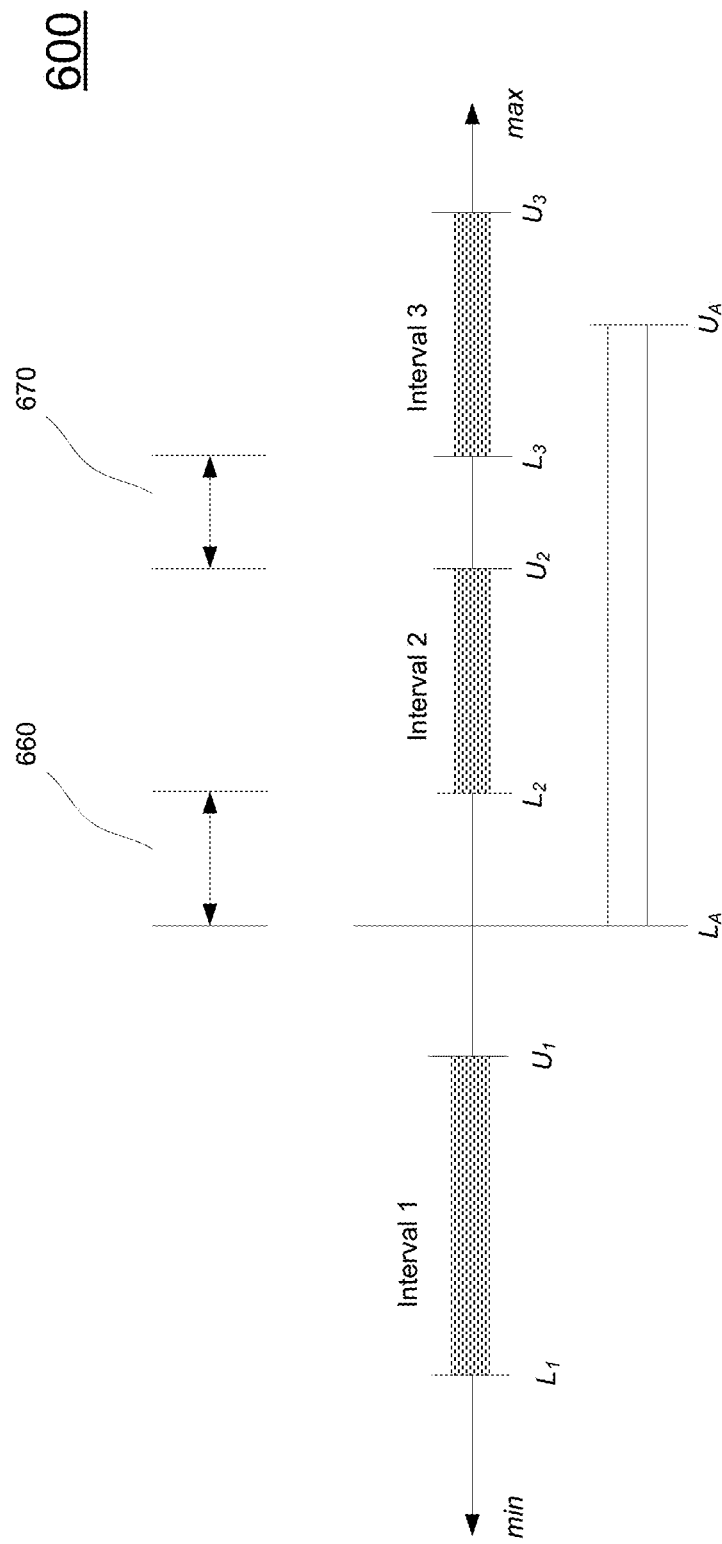

As shown in FIG. 6F, for case 6, the lower bound $L_A$ resides in an uncovered interval, between interval 1 and interval 2, and the upper bound $U_A$ resides in covered interval 3. When the query runs, the attribute vector 600 is enhanced with records in the range ($L_A$, $L_2$) of enhancement zone 660, and records in the range ($U_2$, $L_3$) of enhancement zone 670. In metadata, interval 2 and interval 3 are consolidated and replaced with a continuous interval having the range ($L_A$, $U_3$). For instance, the lower and upper bound of interval 2 may be modified to ($L_A$, $U_3$), while interval 3 is erased. Also, equally effective, the upper and lower bounds of interval 3 may be modified to ($L_A$, $U_3$) while interval 2 is erased.

FIG. 7 is an illustration of a Unified Modeling Language (UML) sequence diagram 700 for dynamically and adaptively building a column store database by importing data that is targeted to satisfy an executing query, in accordance with one embodiment of the present disclosure. For purposes of illustration only, the UML sequence diagram 700 is described through the execution of a sample query, as follows: "SELECT DeptNo, SUM(salary) FROM Employee GROUP BY DeptNo;". The SELECT statement is asking to sum the salaries of employees for each department. As shown in FIG. 7, the various interactions are arranged in time sequence among the components when executing the SELECT statement.

At operation 705, the query manager 790 receives the query or SELECT statement. The query manager 790 manages the process of building the column store database and accessing data from the column store database to process the query and obtain a result. At operation 710, the covered range/intervals (e.g., primary key ranges) of the attribute vectors in the column store database are fetched from the column metadata 793 (e.g., from the column log file) and returned to the query manager 790. At operation 715, the query manager 790 compares the covered intervals against the queried range(s)/interval(s) to determine if the attribute vectors need to be created or the covered ranges need to be enhanced. If an attribute vector needs to be enhanced, then the process defined in outline 701 is performed and managed by the query manager 790. Otherwise, the covered ranges in the attribute vector is sufficient to satisfy the query, and the column data is fetched at operation 770 from the column data buffer 794, or fetched from the column data file 795 (e.g., disk) at 771, and returned to the buffer column data buffer 794. The column data is returned to the query manager 790 at operation 775 to process the query.

The query manager/optimizer 790 is configured to use a table scan operator to fetch all employee records referenced by the query to compute the result. When an attribute vector needs to be created or enhanced, the operations in outline 701 are performed. At operation 720, the data in the uncovered interval (e.g., over a range of primary keys) is fetched from the row data buffer 791. If the buffer 791 does not contain the data, then at operation 725 the data in the uncovered interval is fetched from the row data file 792, and returned at operation 730 to the row data buffer 791. At 735, the retrieved data in the uncovered interval (e.g., the targeted amount of data) is transferred to the column data buffer 794. The applied changes are committed at operation 740 and reported to the column log manager 796. In addition, the attribute vectors and their corresponding metadata are saved to disk at operation 745. After the changes are committed a function call is returned to the row data buffer at operation 750, and another function call is returned to the query manager 790 at operation 755. At operation n760, the query manager consolidates and updates the column metadata 793 to reflect the changes, and a function call 765 is returned to query manager 790. In that manner, the query manager 790 understands that the query can be processed using the column store database. The process moves on to fetch the column data at operation 770 from the column data buffer 794, or it is fetched from the column data file 795 (e.g., disk) at 771 when the data is not in memory, and returned to the buffer column data buffer 794. The column data is returned to the query manager 790 at operation 775 to process the query.

In one embodiment, updating an attribute vector and updating its metadata should be done in one transaction in order to maintain the contents of metadata consistent with the corresponding attribute vectors. It should be noted that both column store and its metadata are built internally to help speed up the analytics queries, in one embodiment. That is, they are transparent to end users. As such, the end users only are exposed to the table schema defined in the row store database.

Thus, according to embodiments of the present disclosure, systems and methods are described for adaptively building a column store database from a row store database to satisfy an analytic query directed to referenced attribute vectors or columns.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer system for accessing information, comprising:
a non-transitory memory storage comprising instructions; and
one or more processors in communication with the memory, wherein the one or more processors execute the instructions to:
establish a row store database for storing data, wherein each row of said row store database comprises a plurality of attributes, wherein said data in said row store database is current to a temporal point in time;
establish a column store database comprising data structured to satisfy received analytic queries; and
begin from an initial state of said column store database, for each subsequently received analytic query, importing a targeted amount of data from a corresponding temporal state of said row store database into said column store database to satisfy said corresponding subsequently received analytic query,
wherein said importing a targeted amount of data causes the one or more processors to further execute the instructions to:
receive a first analytic query, wherein said first analytic query is directed to a queried range of primary key attributes for a referenced attribute vector corresponding to a referenced attribute in said plurality of attributes;
determine if a covered range of said primary key attributes in said referenced attribute vector is within said queried range of primary key attributes; and
when said covered range is not within said queried range, import said targeted amount of data from said row store database during execution of said first analytic query to enhance said covered range in order to encompass said queried range.

2. The computer system of claim 1, wherein said determining if a covered range of said computer-executable instructions causes the one or more processors to further execute the instructions to:
access metadata comprising information related to each attribute vector in said column store database and a covered range of primary keys corresponding to each attribute vector in said column store database.

3. The computer system of claim 1, wherein the one or more processors further execute the instructions to:
update metadata to reflect said targeted amount of data, wherein said metadata comprises information related to each attribute vector in said column store database and a covered range of primary keys corresponding to each attribute vector in said column store database.

4. The computer system of claim 1, wherein said importing data of said computer-executable instructions causes the one or more processors to further execute the instructions to:
perform a full table scan of said row store database to access said targeted amount of data.

5. The computer system of claim 1, wherein said importing data of said computer-executable instructions causes the one or more processors to further execute the instructions to:
perform a partial table scan of said row store database to access said targeted amount of data.

6. The computer system of claim 1, wherein the one or more processors further execute the instructions to:
persistently store said column store database updated with said targeted amount of data to disk.

7. A computer-implemented method for dynamically building a column store database from a row store database, comprising;
establishing said row store database for storing data, wherein each row of said row store database comprises a plurality of attributes, wherein said data in said row store database is current to a temporal point in time;
establishing said column store database comprising data structured to satisfy received analytic queries; and
beginning from an initial state of said column store database, for each subsequently received analytic query, importing a targeted amount of data from a corresponding temporal state of said row store database into said column store database to satisfy said corresponding subsequently received analytic query,
wherein said importing a targeted amount of data comprises:
receiving a first analytic query, wherein said first analytic query is directed to a queried range of primary key attributes for a referenced attribute vector corresponding to a referenced attribute in said plurality of attributes;
determining if a covered range of said primary key attributes in said referenced attribute vector is within said queried range of primary key attributes; and
when said covered range is not within said queried range, importing said targeted amount of data from said row store database during execution of said first analytic query to enhance said covered range in order to encompass said queried range.

8. The computer-implemented method of claim 7, wherein said determining if a covered range comprises:
accessing metadata comprising information related to each attribute vector in said column store database and a covered range of primary keys corresponding to each attribute vector in said column store database.

9. The computer-implemented method of claim 7, further comprising:
updating metadata to reflect said targeted amount of data, wherein said metadata comprises information related to each attribute vector in said column store database and a covered range of primary keys corresponding to each attribute vector in said column store database.

10. The computer-implemented method of claim 7, wherein said importing a targeted amount of data comprises:
performing a full table scan of said row store database to access said targeted amount of data.

11. The computer-implemented method of claim 7, wherein said importing a targeted amount of data comprises:
performing a partial table scan of said row store database to access said targeted amount of data.

12. The computer-implemented method of claim 7, further comprising:
persistently storing said column store database updated with said targeted amount of data to disk.

13. A non-transitory computer-readable storage medium storing computer instructions for dynamically building a column store database from a row store database, that when executed by one or more processors, cause the one or more processors to perform the steps of:

establishing said row store database for storing data, wherein each row of said row store database comprises a plurality of attributes, wherein said data in said row store database is current to a temporal point in time;

establishing said column store database comprising data structured to satisfy received analytic queries; and beginning from an initial state of said column store database, for each subsequently received analytic query, importing a targeted amount of data from a corresponding temporal state of said row store database into said column store database to satisfy said corresponding subsequently received analytic query, wherein said importing a targeted amount of data causes the one or more processors to further perform the steps of:

receiving a first analytic query, wherein said first analytic query is directed to a queried range of primary key attributes for a referenced attribute vector corresponding to a referenced attribute in said plurality of attributes;

determining if a covered range of said primary key attributes in said referenced attribute vector is within said queried range of primary key attributes; and when said covered range is not within said queried range, importing said targeted amount of data from said row store database during execution of said first analytic query to enhance said covered range in order to encompass said queried range.

14. The non-transitory computer-readable storage medium of claim 13, wherein said determining if a covered range causes the one or more processors to further perform the steps of:

accessing metadata comprising information related to each attribute vector in said column store database and a covered range of primary keys corresponding to each attribute vector in said column store database.

15. The non-transitory computer-readable storage medium of claim 13, wherein the one or more processors further perform the steps of:

updating metadata to reflect said targeted amount of data, wherein said metadata comprises information related to each attribute vector in said column store database and a covered range of primary keys corresponding to each attribute vector in said column store database.

16. The non-transitory computer-readable storage medium of claim 13, wherein said importing data causes the one or more processors to further perform the steps of:

performing a full table scan of said row store database to access said targeted amount of data.

17. The non-transitory computer-readable storage medium of claim 13, wherein said importing data causes the one or more processors to further perform the steps of:

performing a partial table scan of said row store database to access said targeted amount of data.

* * * * *